US012492707B2

(12) United States Patent
Sishtla et al.

(10) Patent No.: US 12,492,707 B2
(45) Date of Patent: Dec. 9, 2025

(54) IMPELLER WITH VARIABLE BACKSWEEP ANGLE

(71) Applicant: Carrier Corporation, Palm Beach Gardens, FL (US)

(72) Inventors: Vishnu Sishtla, Manlius, NY (US); Chaitanya Halbe, Liverpool, NY (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 19/056,114

(22) Filed: Feb. 18, 2025

(65) Prior Publication Data

US 2025/0283478 A1 Sep. 11, 2025

Related U.S. Application Data

(60) Provisional application No. 63/563,535, filed on Mar. 11, 2024.

(51) Int. Cl.

*F04D 29/24* (2006.01)
*F01D 5/14* (2006.01)
*F04D 29/28* (2006.01)
*F04D 29/30* (2006.01)

(52) U.S. Cl.

CPC ........... *F04D 29/247* (2013.01); *F01D 5/147* (2013.01); *F04D 29/284* (2013.01); *F04D 29/305* (2013.01); *F05D 2220/30* (2013.01); *F05D 2240/24* (2013.01); *F05D 2240/30* (2013.01)

(58) Field of Classification Search

CPC .... F04D 29/321; F04D 29/305; F04D 29/324; F04D 29/36; F04D 29/382; F04D 29/384; F04D 29/388; F04D 29/30; F04D 29/32; F04D 29/24; F04D 29/242; F04D 29/247

See application file for complete search history.

(56) References Cited

U.S. PATENT DOCUMENTS 2,986,219 A 5/1961 Boardman, Jr. et al.
5,993,158 A * 11/1999 Young ...................... B63H 1/06 416/223 R
9,850,760 B2 12/2017 Crosatti et al.
(Continued)

FOREIGN PATENT DOCUMENTS

CN 204878049 U 12/2015
CN 115681209 A 2/2023
(Continued)

OTHER PUBLICATIONS

Extended European Search Report received for EP Application No. 25156632.9, mailed on Jul. 18, 2025, 9 Pages.

*Primary Examiner* — Nathaniel E Wiehe
*Assistant Examiner* — Maxime M Adjagbe
(74) *Attorney, Agent, or Firm* — Drew Folgmann

(57) ABSTRACT

Described herein is an impeller for a flow device. The impeller comprises a hub, and a plurality of blades extending radially outwards from the hub, wherein each of the blades is at least partially attached to an outer surface of the hub such that at least a portion of a tip end, opposite to the hub, of the corresponding blades remains unattached to the outer surface of the hub, wherein the unattached portion of the blades is free to deflect based on a rotational speed of the impeller and correspondingly adjust a backsweep angle of the corresponding blades within a predefined range.

20 Claims, 7 Drawing Sheets

(56) References Cited

U.S. PATENT DOCUMENTS

| | | | | |
|---|---|---|---|---|
| 10,724,537 | B2 | 7/2020 | Ahn et al. | |
| 11,041,503 | B2 * | 6/2021 | Iurisci | F04D 29/285 |
| 11,572,893 | B2 | 2/2023 | Lee et al. | |
| 11,802,525 | B2 | 10/2023 | Chaudhari et al. | |
| 2002/0122731 | A1 | 9/2002 | Marioni | |
| 2009/0008067 | A1 * | 1/2009 | Kuan | F04D 29/582 165/80.3 |
| 2012/0213632 | A1 * | 8/2012 | Parry | F04D 29/026 415/208.1 |
| 2014/0193260 | A1 | 7/2014 | Block et al. | |
| 2014/0356168 | A1 | 12/2014 | Cocks et al. | |
| 2016/0003258 | A1 * | 1/2016 | Wu | F04D 25/0613 415/203 |
| 2018/0128109 | A1 | 5/2018 | Humes et al. | |
| 2020/0189557 | A1 * | 6/2020 | Sakamoto | B60W 10/08 |
| 2021/0071681 | A1 | 3/2021 | Hsu et al. | |
| 2022/0307520 | A1 | 9/2022 | Mosiewicz | |
| 2024/0401606 | A1 * | 12/2024 | Guriev | F04D 29/284 |

FOREIGN PATENT DOCUMENTS

| | | | |
|---|---|---|---|
| CN | 115717604 | B | 6/2023 |
| CN | 219139460 | U | 6/2023 |
| JP | 2002349498 | A | 12/2002 |
| JP | 3130089 | U | 3/2007 |
| JP | 5128555 | B2 | 1/2013 |
| JP | 3204521 | U | 6/2016 |
| JP | 6753865 | B2 | 9/2020 |
| KR | 10-1223787 | B1 | 1/2013 |
| WO | 2016096041 | A1 | 6/2016 |
| WO | 2019018931 | A9 | 1/2019 |

* cited by examiner

IMPELLER WITH VARIABLE BACKSWEEP ANGLE

CROSS-REFERENCE TO RELATED APPLICATION

This patent application claims the benefit of U.S. Provisional Patent Application No. 63/563,535, filed on Mar. 11, 2024, which is incorporated by reference herein in its entirety.

BACKGROUND

The subject disclosure relates to the field of impellers, and more particularly, to an impeller with variable backsweep angle.

SUMMARY

Described herein is an impeller for a flow device. The impeller comprises a hub, and a plurality of blades extending radially outwards from the hub, wherein each of the blades is at least partially attached to an outer surface of the hub such that at least a portion of a tip end, opposite to the hub, of the corresponding blades remains unattached to the outer surface of the hub, wherein the unattached portion of the blades is free to deflect based on a rotational speed of the impeller and correspondingly adjust a backsweep angle of the corresponding blades within a predefined range.

In one or more embodiments, the unattached portion of the blades extends at least partially beyond an outermost diameter of the hub.

In one or more embodiments, the predefined range of the backsweep angle ranges from 15 to 60 degrees from a radial direction from the hub.

In one or more embodiments, each of the blades has a substantially curved profile, extending in a predefined direction about a longitudinal axis or axis of rotation of the hub, such that a plurality of fluidic passages is formed or defined between the adjacent blades to allow flow of a fluid therethrough.

In one or more embodiments, the outer surface of the hub has a substantially curved profile, wherein an outer diameter of the hub increases in a direction while moving from a leading end towards a trailing end of the hub, wherein the unattached portion of the hub extends at least partially beyond the outer diameter of the trailing end of the hub.

In one or more embodiments, each of the blades comprises a coupling side attached to the outer surface of the hub, a leading edge located adjacent to a leading end of the hub, a trailing edge located adjacent to a trailing end of the hub, and a curved edge opposite to the coupling side and extending between the trailing edge and the leading edge of the corresponding blades.

In one or more embodiments, the trailing edge of the plurality of blades are circumferentially offset from the corresponding leading edge of the blade.

In one or more embodiments, a portion, at the leading edge, of each of the blades is substantially curved in a direction opposite to the predefined direction.

In one or more embodiments, each of the blades has a variable thickness between the leading edge and the trailing edge of the corresponding blades.

In one or more embodiments, the thickness of each of the blades reduces while moving in a radial direction from the coupling side towards the tip end or outer edge of the corresponding blades.

In one or more embodiments, each of the blades has a variable thickness between the coupling side and the curved edge of the corresponding blades.

In one or more embodiments, the thickness of each of the blades reduces while moving in a direction from the leading edge towards the trailing edge of the corresponding blades.

In one or more embodiments, the thickness of each of the blades increases while moving from the leading edge towards a middle portion of the corresponding blades and further reduces while moving towards the trailing edge of the corresponding blades.

In one or more embodiments, the impeller comprises a shroud encasing the hub and the plurality of blades, such that a first end of the shroud located adjacent to the leading edge of the blades remains open to allow inflow of a fluid therewithin, and a second end of the shroud located adjacent to the trailing edge of the blades remains open to allow outflow of the fluid therefrom.

In one or more embodiments, the shroud encases the hub and the plurality of blades, such that the unattached portion of the blades remains enclosed by and unattached to the shroud.

In one or more embodiments, the shroud has a substantially curved profile, wherein a diameter of the shroud increases while moving in a direction from a leading end towards a trailing end of the hub.

In one or more embodiments, the plurality of blades, the hub, and the shroud are made of a non-metallic material.

In one or more embodiments, the plurality of blades is made of a composite material having a predetermined flex modulus.

In one or more embodiments, the impeller comprises a plurality of splitters configured in an alternating arrangement with the plurality of blades such that one of the splitters remains between adjacent blades, wherein the splitters extend radially outwards from the hub such that at least a portion of a tip end, opposite to the hub, of the corresponding splitter remains unattached to the outer surface of the hub.

In one or more embodiments, the flow device is selected from a group comprising a centrifugal compressor, a centrifugal pump, and a turbine.

The foregoing summary is illustrative only and is not intended to be in any way limiting. In addition to the illustrative aspects, embodiments, and features described above, further aspects, embodiments, features, and techniques of the subject disclosure will become more apparent from the following description taken in conjunction with the drawings.

BRIEF DESCRIPTION OF THE DRAWINGS

The accompanying drawings are included to provide a further understanding of the subject disclosure and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
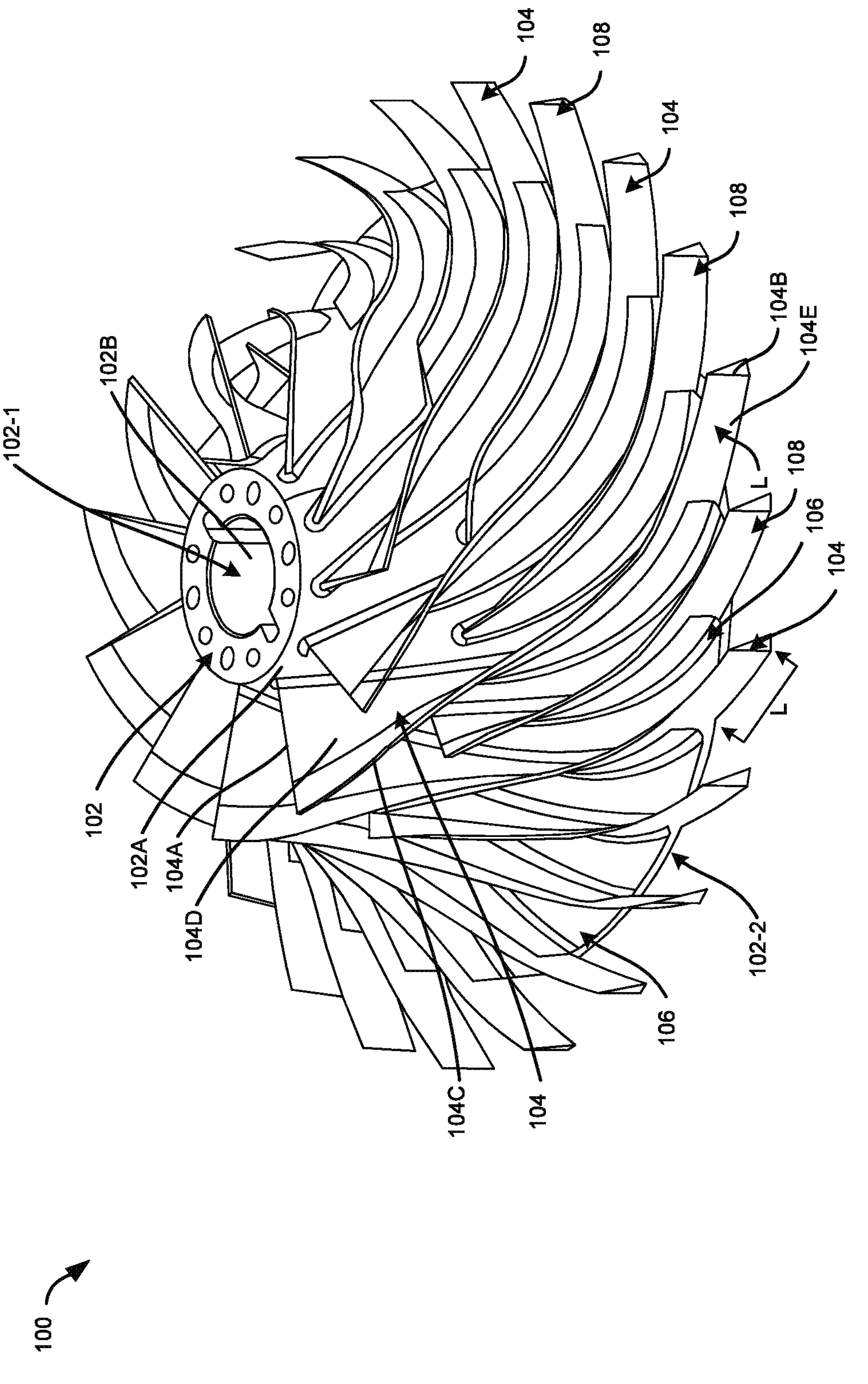
FIGS. 1A to 1C illustrate exemplary views of an unshrouded impeller for a flow device (centrifugal compressor) in accordance with one or more embodiments of the subject disclosure.

The following is a detailed description of embodiments of the subject disclosure depicted in the accompanying drawings. The embodiments are in such detail as to clearly communicate the subject disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

The terms "leading end", as used herein, refer to an upstream end of the impeller, which first receives or comes in contact with the fluid flowing through the flow device, regardless of whether the flow device is a compressor, pump, or turbine. Further, the terms "trailing end", as used herein, refer to a downstream end of the impeller, which is opposite to the upstream end.

The terms "longitudinal axis" and "axis of rotation", as used herein, refer to the z-axis, about which the impeller in the flow device rotates, regardless of whether the flow device is a compressor, pump, or turbine. Further, the terms "radial direction", as used herein, refer to an axis that is normal to the z-axis.

In the specification, reference may be made to the spatial relationships between various components and to the spatial orientation of various aspects of components as the devices are depicted in the attached drawings. However, as will be recognized by those skilled in the art after a complete reading of the subject disclosure, the components of the subject disclosure. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, described herein may be oriented in any desired direction.

Flow devices such as but not limited to centrifugal compressors play an important role in a wide array of applications, such as in HVAC systems. The efficiency, performance, and operational flexibility of these compressors may be significantly influenced by the design of their impellers, particularly the geometry of the impeller blades. The backsweep angle of impeller blades is an important design parameter that may affect the performance characteristics of centrifugal compressors. This backsweep angle, defined by the orientation of the blade's trailing edge relative to the direction of rotation, may influence the compressor's operating range, efficiency, and the head it can produce.

Typically, an impeller with a larger backsweep angle may have a wider operating range but may sacrifice some head, making it suitable for applications requiring varied flow conditions. Conversely, an impeller with a smaller backsweep angle may generate a higher head, beneficial for applications where a significant elevation of pressure is needed at a relatively constant flow rate.

The operating points of chillers and heat pumps (HPs), which are important components in refrigeration and heating systems, respectively, may often necessitate specific performance characteristics from the centrifugal compressors they involve. Adjusting the backsweep angle of the impeller blades may optimize the compressor's performance to match the required operating point, enhancing the overall efficiency and effectiveness of the system.

However, conventional impeller designs, both shrouded and unshrouded, have fixed backsweep angles. These blades, stretching from the leading edge to the trailing edge, are rigidly affixed to the hub (and to the shroud in the case of shrouded impellers). As a result, once manufactured, the backsweep angle of these impellers cannot be adjusted to cater to varying operational demands or to optimize performance across a broader range of conditions. This inherent inflexibility may restrict the adaptability of centrifugal compressors, compromising either on the efficiency or operational range, depending on the fixed geometry of the impeller blades.

There is, therefore, a need for a solution to effectively address the challenges associated with existing impellers used in flow devices (centrifugal compressors), by providing an improved impeller capable of adjusting its backsweep angle in response to changing operational requirements. This may improve the overall performance and operating range of the flow devices equipped with this impeller.

Referring to FIGS. 1A to 2C, an impeller 100 for use with a flow device associated with a heating, ventilation, and air conditioning (HVAC) system (not shown) is disclosed. In one or more embodiments, the flow device can be selected from a group comprising a centrifugal compressor, a centrifugal pump, and a turbine, but is not limited to the like. While various embodiments have been described herein for the flow device being a centrifugal compressor for the sake of brevity, however, the impeller may also be associated with other flow devices as well without any limitation.

In one or more embodiments, the impeller 100 can include a hub 102 having an outer surface 102A (along a flow path of fluid in the flow device) extending from a leading end 102-1 (upstream end) 102-1 towards a trailing end 102-2 (downstream end) 102-2 of the hub 102. The hub 102 can further include an inner diameter surface 102-B at one end which can be configured to receive and mate with a shaft of a drive (motor and/or gears) (not shown) associated with the flow device, such that rotation of the drive can rotate the hub 102 and the impeller 100 about a longitudinal axis or axis of rotation A-A' of the hub 102 within the flow device.

The impeller 100 can further include a plurality of blades 104 (also referred to as primary blades 104, herein) extending radially outwards from the outer surface 102A of the hub 102. In one or more embodiments, each of the blades 104 can have a substantially curved profile, extending outwards from the hub 102 and curved in a predefined (clock-wise or counter-clock-wise) direction about the longitudinal axis or axis of rotation A-A' of the hub 102, such that a plurality of fluidic passages 106 is formed or defined between the adjacent blades 104 to allow flow of the fluid therethrough. However, in other embodiments, the blades 104 can also have a substantially straight profile, without any limitations.

As illustrated, each of the blades 104 can include a leading edge 104A located adjacent to the leading end 102-1 of the hub 102, a trailing edge 104B located adjacent to the trailing end 102-2 of the hub 102, a coupling side extending between the trailing edge 104B and the leading edge 104A which remains attached to the outer surface 102A of the hub 102, a curved edge 104C opposite to the coupling side which extends between the trailing edge 104B and the leading edge 104A of the corresponding blades 104, and a tip T defining the trailing edge 104B. The blades 104 can accordingly define a first face 104D (surface) and a second face 104E (opposite to the first face) between the leading edge 104A, the trailing edge 104B, the coupling side, and the curved edge 104C.

Figure 3A:
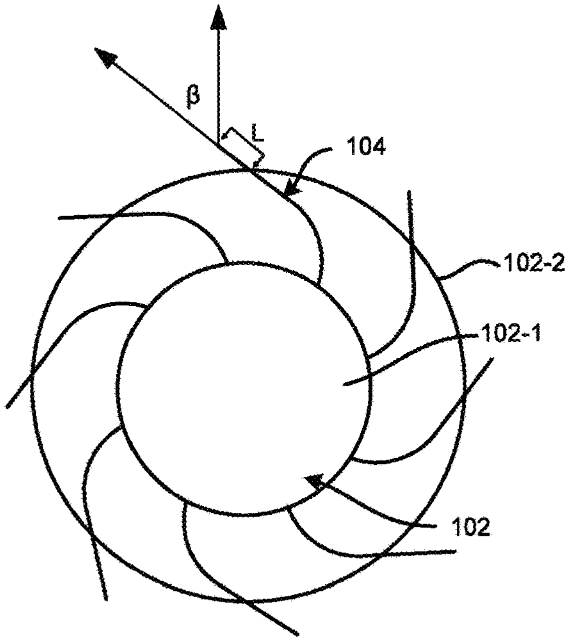
FIGS. 3A and 3B illustrate exemplary top-view representations of the impeller to depict the variation in backsweep angle at different rotational speeds in accordance with one or more embodiments of the subject disclosure
Figure 3B:
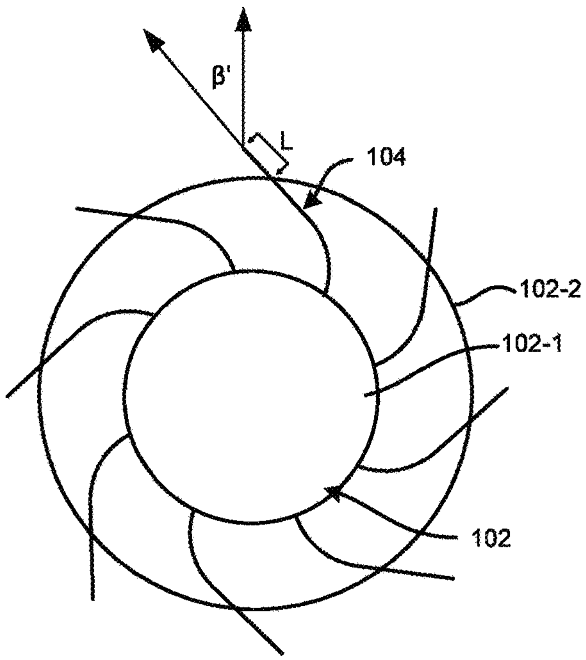

In one or more embodiments, each of the blades 104 can be at least partially attached to the outer surface 102A of the hub 102 such that at least a portion or length (L) of the tip end or trailing edge 104B end of the corresponding blades 104 remains unattached to the outer surface 102A of the hub 102. Further, the unattached portion L of the blades 104 can extend at least partially beyond the outermost diameter (outer periphery of the trailing end 102-2) of the hub 102. Accordingly, the unattached portion L of the blades 104 can be free to deflect based on the rotational speed of the impeller 100 and correspondingly adjust the backsweep angle (β) of the corresponding blades 104 within a predefined range as shown in FIGS. 3A and 3B.

In one or more embodiments, each of the blades 104 can have a variable thickness between the coupling side and the curved edge 104C of the corresponding blades 104. However, in other embodiments, each of the blades 104 can also have a uniform thickness between the coupling side and the curved edge 104C of the corresponding blades 104. Further, in one or more embodiments, each of the blades 104 has a variable thickness between the leading edge 104A and the trailing edge 104B of the corresponding blades 104. However, in other embodiments, each of the blades 104 can also have a uniform thickness between the leading edge 104A and the trailing edge 104B of the corresponding blades 104.

In addition, in one or more embodiments, but not limited to the like, the width of each of the blades 104 can also be reduced while moving in a direction from the leading edge 104A towards the trailing edge 104B of the corresponding blades 104. However, in other embodiments, the width of each of the blades 104 can also be the same or may increase while moving between the leading edge 104A and the trailing edge 104B of the corresponding blades 104.

In one or more embodiments, but not limited to the like, the thickness of each of the blades 104 can be reduced while moving in a radial direction from the coupling side towards the tip end or outer edge of the corresponding blades 104. Further, in one or more embodiments, the thickness of each of the blades 104 can increase while moving in a direction from the leading edge 104A toward the trailing edge 104B of the corresponding blades 104. Further, in some embodiments, the thickness of each of the blades 104 can first increase while moving from the leading edge 104A towards a middle portion of the corresponding blades 104 and further reduce while moving towards the trailing edge 104B of the corresponding blades 104. However, in other embodiments, the thickness of each of the blades 104 can be reduced while moving in a direction from the leading edge 104A toward the trailing edge 104B of the corresponding blades 104.

In one or more embodiments, as shown in FIG. 3A, when the impeller 100 is rotated at a lower rotational speed, the centrifugal force on the tip end or trailing edge 104B of the blades 104 may be less. This reduction in centrifugal force may result in less deflection in the blades 104 of the impeller 100, thereby maintaining a high backsweep angle (β). Further, in one or more embodiments, as shown in FIG. 3A, when the impeller 100 is rotated at higher rotational speeds, the increased centrifugal force may cause the blades 104 of the impeller 100 to straighten, leading to a decrease in the backsweep angle (β'). In one or more embodiments, the variable backsweep angle (β) to (β') design of the impeller 100 may allow it to operate in a rotational speed in a range of 60 to 105% of the design (nominal) speed. Accordingly, the backsweep angle (β) of the blades 104 of the impeller 100 may vary within the predefined range of 15 to 60 degrees from a radial direction from the hub 102. Thus, this variation in the backsweep angle (β) in the blades 104 of the impeller 100 may improve the overall performance and operating range of the associated centrifugal compressor and the HVAC systems.

In one or more embodiments, the outer surface 102A of the hub 102 can axially extend at the leading (upstream) end and then radially outward at the trailing (downstream) end such that an axial inlet to the longitudinal axis A-A' can be formed at the leading end 102-1 and a radial outlet can be formed at the trailing end 102-2 of the hub 102, within a casing (not shown) or a shroud (shown in FIGS. 2A to 2C) associated with the flow device. As a result, the outer surface 102A of the hub 102 can have a substantially curved profile, where the outer diameter of the hub 102 can increase in a direction while moving from the leading end 102-1 toward the trailing end 102-2 of the hub 102. However, in other embodiments, the hub 102 can also have a cylindrical profile.

In one or more embodiments, a portion of the blades 104 near the leading end 102-1 can protrude generally radially outward from the hub 102 and another portion towards the trailing end 102-2 can protrude axially from the hub 102. In one or more embodiments, the trailing edge 104B of the blades 104 can be circumferentially offset from the corresponding leading edge 104A of the blade 104. Further, the portion, at the leading edge 104A, of each blade 104 can be substantially curved in a direction, opposite to the predefined direction. Accordingly, the portion of the blades 104, near the trailing end 102-2, can remain generally axially oriented with respect to the radial outlet of the impeller 100. However, the portion of the blades 104, near the leading edge 104A, can remain generally radially oriented or substantially parallel to a plane (normal to the rotational axis A-A') of the axial inlet of the impeller 100.

In one or more embodiments, the impeller 100 can include a plurality of splitters 108 (also referred to as splitter blades or secondary blades, herein) configured in an alternating arrangement with the plurality of main blades 104 such that one of the splitters 108 remains between the adjacent main blades 104. The splitters 108 can be configured to split the fluid flowing through the fluidic passages 106 formed between the adjacent blades 104. The splitters 108 can also have a substantially curved profile that can extend radially outwards from the hub 102 and remain attached to the outer surface 102A of the hub 102. Further, the length of the splitters 108 can be substantially smaller than the main blades 104, such that a trailing edge of the splitters 108 can be free to deflect and can also extend beyond the outer diameter of the hub 102. However, in one or more embodiments (not shown), the length of the splitters 108 can be substantially smaller than the main blades 104, with the splitters 108 not extending beyond the outer diameter of the hub 102.

Figure 2A:
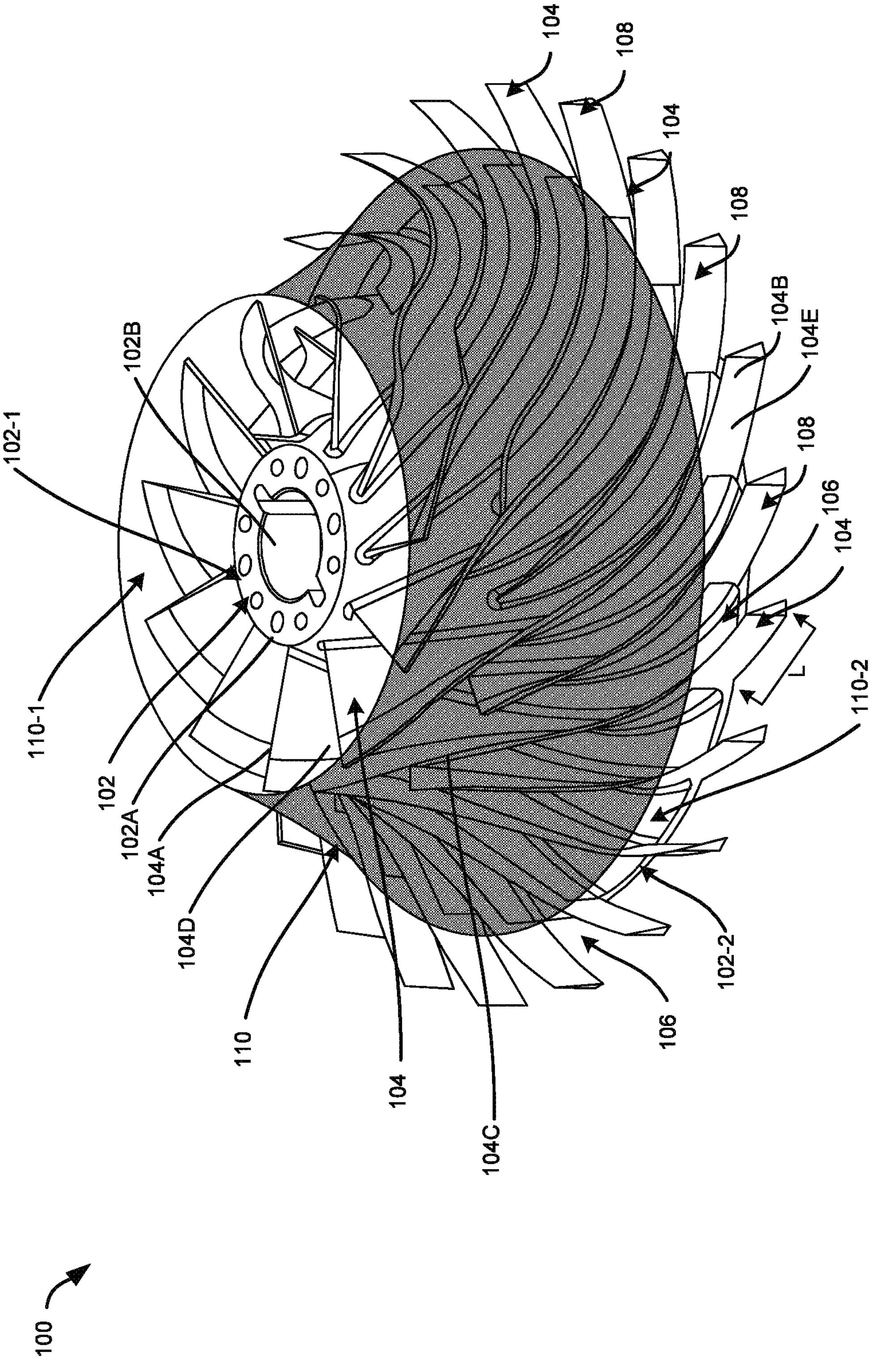
FIGS. 2A to 2C illustrate exemplary views of a shrouded impeller for a flow device (centrifugal compressor) in accordance with one or more embodiments of the subject disclosure.
Figure 2B:
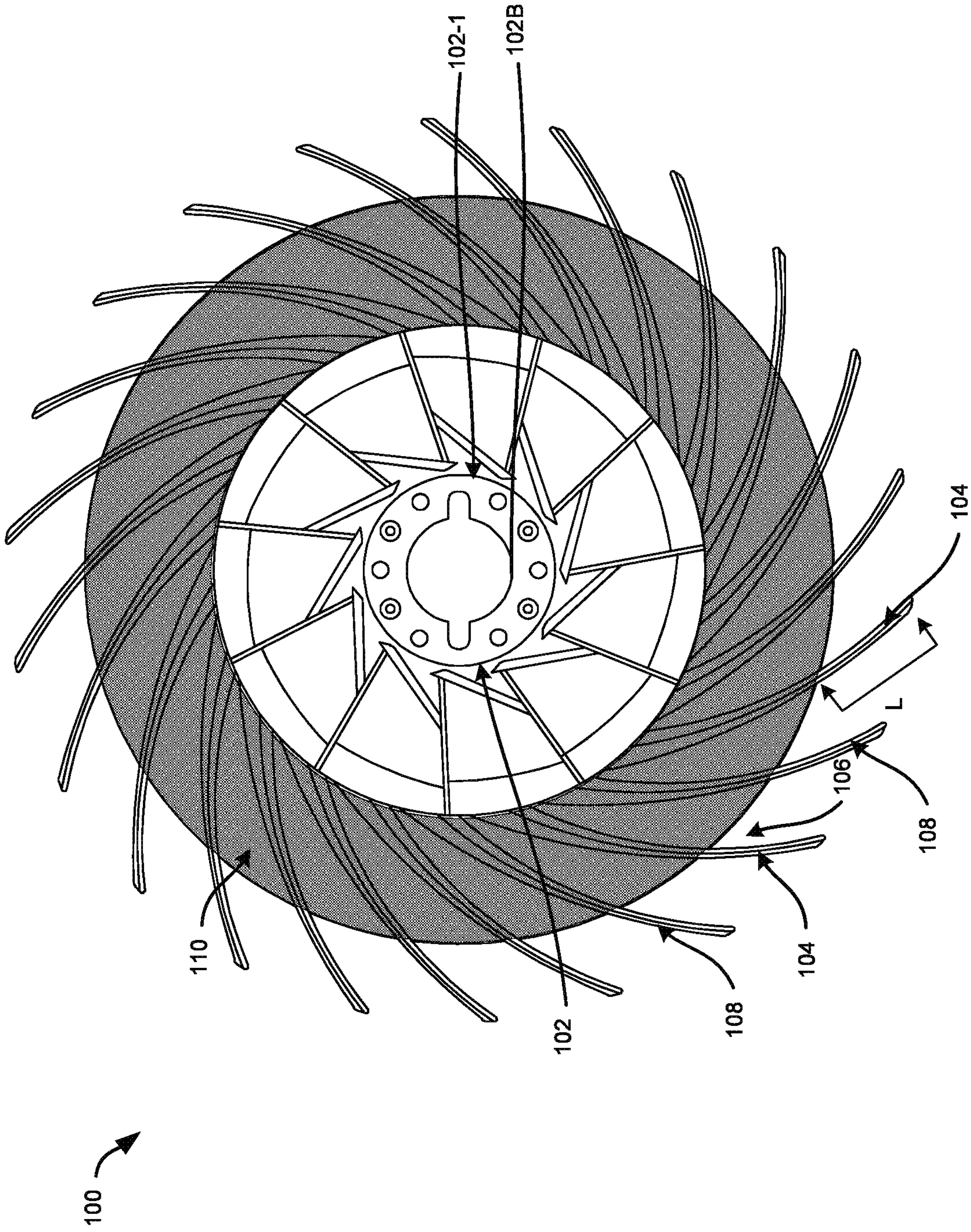
Figure 2C:
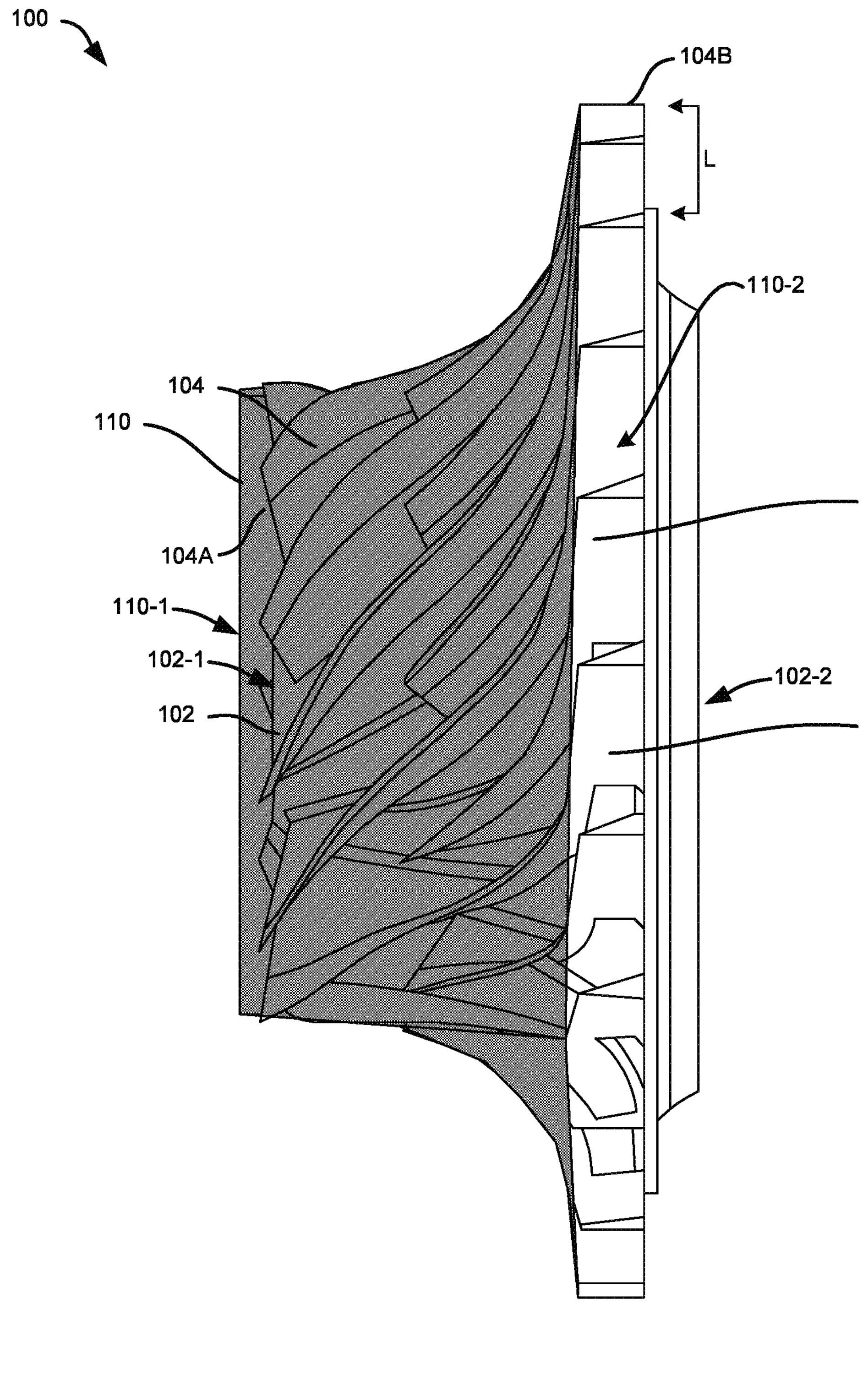

Referring to FIGS. 2A to 2C, in one or more embodiments, the impeller 100 can include a shroud 110 encasing the hub 102, the blades 104, and the splitters 108, such that a first end 110-1 of the shroud 110 located adjacent to the leading edge 104A of the blades 104 or the leading end 102-1 of the impeller 100 remains open to form the axial inlet 110A that allows inflow of a fluid therewithin. Further, a second end 110-2 of the shroud 110 located adjacent to the trailing edge 104B of the blades 104 or trailing end 102-2 of the impeller 100 remains open to form the radial outlet 110B that allows outflow of the fluid therefrom. Further, the shroud 110 can encase the hub 102 and the blades 104, such that the unattached portion L of the blades 104 remains enclosed by and unattached to the shroud 110. Furthermore, the unattached portion L of the blades 104 can extend at least partially out of the shroud 110 via the radial outlet.

In one or more embodiments, the shroud 110 can also have a substantially curved profile based on an outer profile of the hub 102 and the blades 104. The diameter of the shroud 110 can increase while moving in a direction from the first end 110-1 toward the second end 110-2 of the shroud 110 or from the leading end 102-1 towards the trailing end 102-2 of the hub 102. As illustrated, the axial inlet 110A of the shroud 110 or impeller 100 can have an opening of a predefined diameter extending along a plane that is normal to the longitudinal axis A-A' at the leading end 102-1. Further, the radial outlet 110B of the shroud 110 or impeller 100 can have an opening of a predefined width that remains axially oriented and extends circumferentially around an outer diameter of the trailing end 102-2 of the hub 102.

Figure 1B:
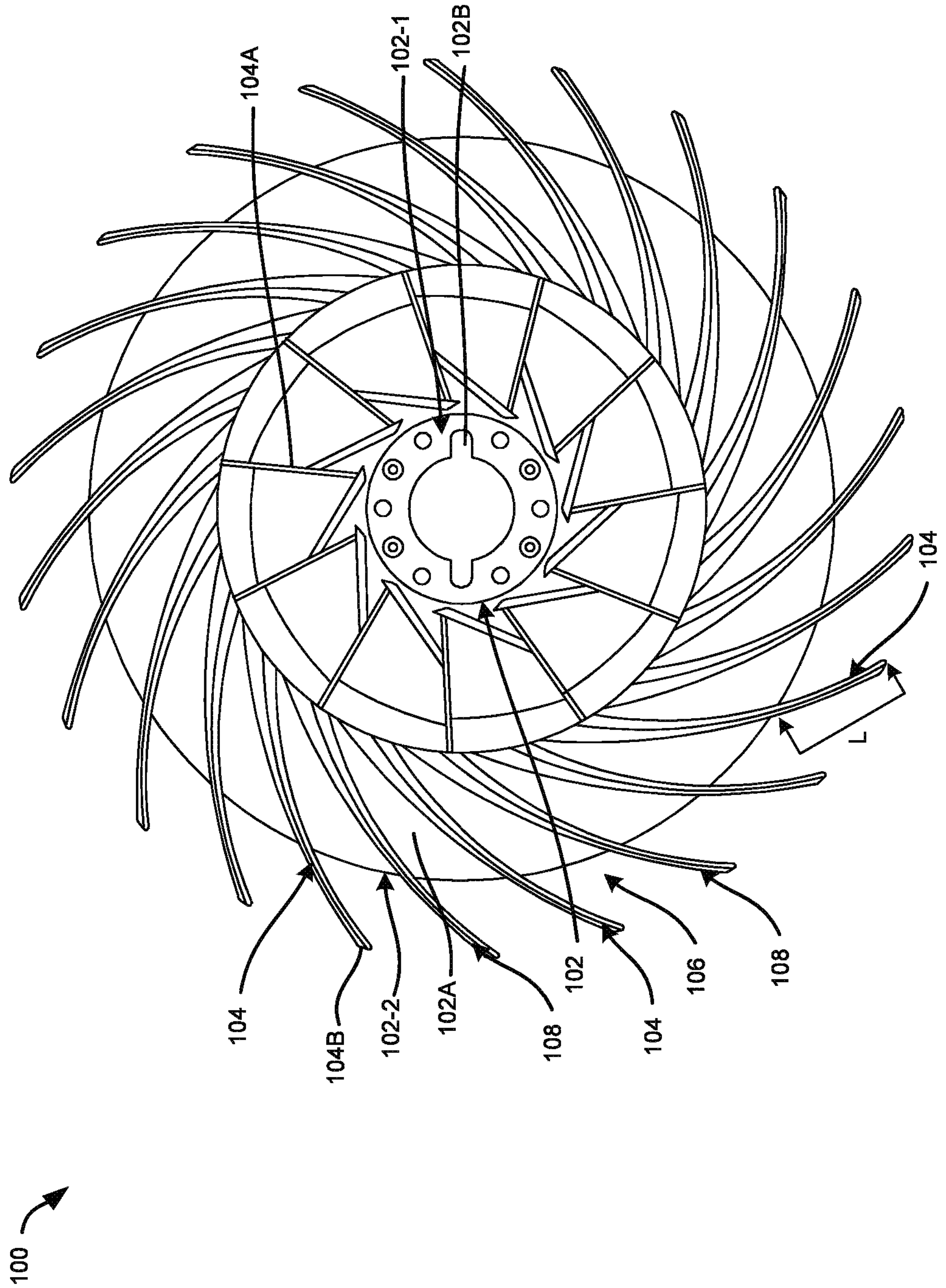
Figure 1C:
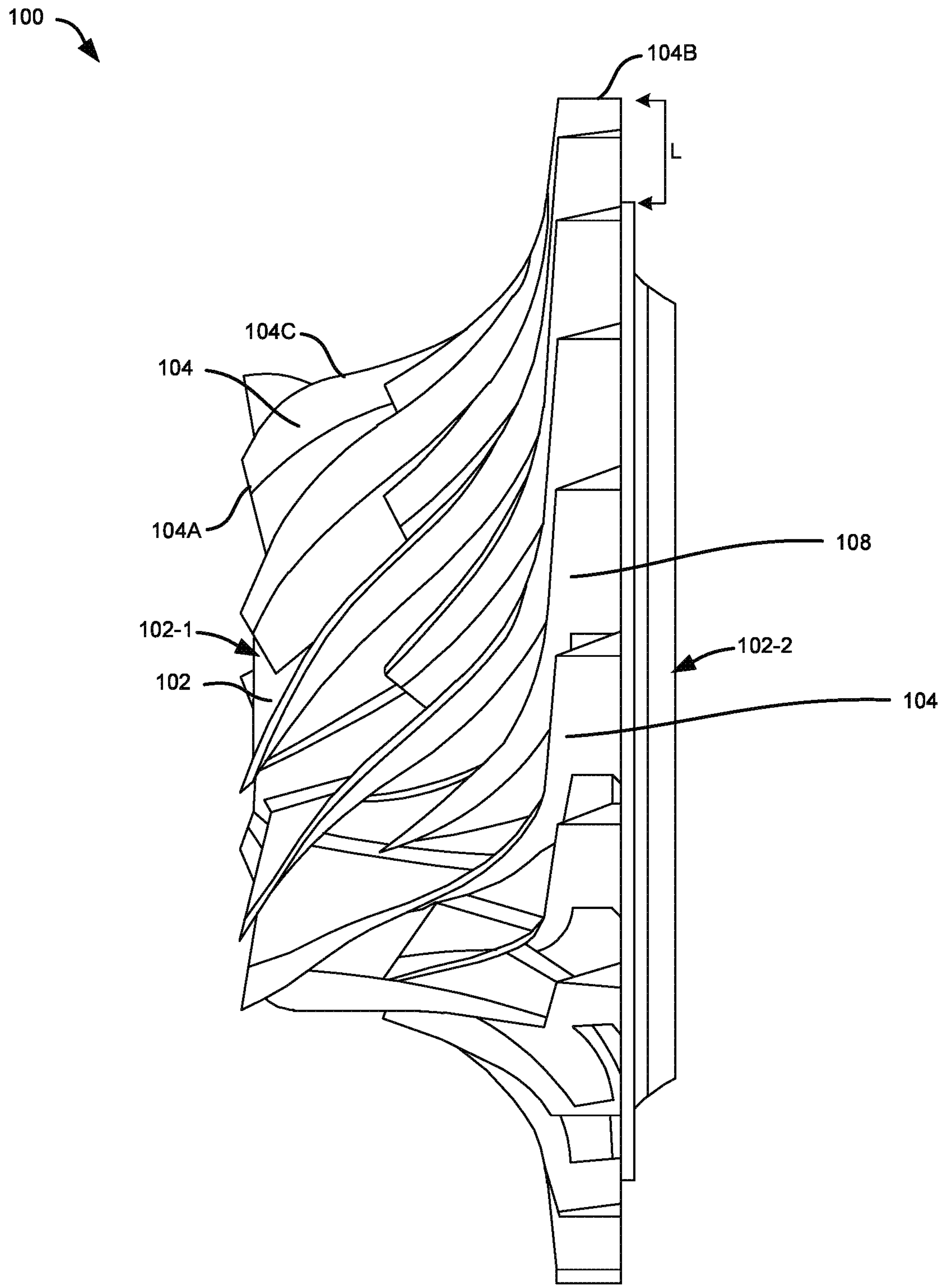

In one or more embodiments, in a shrouded impeller 100 as shown in FIG. 2A to 2C, the integral shroud 110 can surround the blades 104 so that the blades 104 extend across a flow path between the surface of the hub 102 and the surface of the shroud 110. The shroud 110 can rigidify the blades 104 and reduce vibrations. This may allow the use of a relatively thinner blade structure than in an equivalent open impeller 100 wherein the blades 104 are secured only to the hub 102. Further, in one or more embodiments, in an open impeller 100 design (without the shroud 110) as shown in FIG. 1A to 1C, the edges of the blades 104 can closely interface with a separate casing on the compressor. There may be position control between the impeller 100 and casing to balance the loss of efficiency due to leakage against the risk of damage from impeller-to-casing contact.

Referring to FIGS. 1A to 2C, in one or more embodiments, the blades 104, the hub 102, the splitters 108, and the shroud 110 of the impeller 100 can be made of a non-metallic, non-corrosive material. Further, the blades 104, the hub 102, the splitters 108, and the shroud 110 of the impeller 100 can the blades 104, the hub 102, the splitters 108, and the shroud 110 of the impeller 100 can be made of alloys. However, in other embodiments, the flow device and the impeller 100 can be constructed using any standard or newly developed materials and methods, and all such embodiments are well within the scope of the subject disclosure. In one or more embodiments, the impeller 100 or the components of the impeller 100 may be manufactured using additive manufacturing processes and/or 3D printing techniques. However, the impeller 100 or its components can also be manufactured using any standard or newly developed methods, and all such embodiments are well within the scope of the subject disclosure.

Further, in one or more embodiments, the plurality of blades 104 can be specifically made of a composite material having a predetermined flex modulus, which may be coated with layer(s) of non-corrosive material(s). This may provide the blades 104 with intrinsic flexibility, which allows the blades 104 to deflect and adjust the backsweep angle based on the rotational speed of the impeller 100.

Thus, the subject disclosure overcomes the challenges associated with existing impellers, by providing an improved impeller that is capable of adjusting its backsweep angle in response to changing operational speed without any external control mechanism. It is to be appreciated that when the compressor (flow device) is operating at a lower rotational speed, typical of a part-load condition in HVAC systems (chillers or heat pumps), the centrifugal force is less. This reduction in force results in less deflection in the blades of the impeller, thereby preserving the high backsweep angle. Further, when the compressor is operating at higher rotational speeds, which are common during full-load conditions in HVAC systems (chillers or heat pumps), the increased centrifugal force causes the blades of the impeller to straighten, leading to a decrease in the backsweep angle. This improves the overall performance and operating range of the associated centrifugal compressor and the HVAC systems.

While the subject disclosure has been described with reference to exemplary embodiments, it will be understood by those skilled in the art that various changes may be made and equivalents may be substituted for elements thereof without departing from the scope of the subject disclosure as defined by the appended claims. Modifications may be made to adopt a particular situation or material to the teachings of the subject disclosure without departing from the scope thereof. Therefore, it is intended that the subject disclosure not be limited to the particular embodiment disclosed, but that the subject disclosure includes all embodiments falling within the scope of the subject disclosure as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. An impeller for a flow device, the impeller comprising:

a hub; and a plurality of blades, wherein each blade comprises:

an attached portion, attached to an outer surface of the hub; and an unattached tip end portion, extending radially beyond and unattached to the outer surface of the hub, wherein the unattached tip end portion of a blade of the plurality of blades is configured to deflect based on a rotational speed of the impeller and correspondingly adjust a backsweep angle of the blade within a predefined range, and wherein at least part of the attached portion is curved in a direction different from a curvature of the unattached tip end portion of the blade.

2. The impeller of claim 1, wherein the unattached tip end portion of the plurality of blades extends at least partially beyond an outermost diameter of the hub.

3. The impeller of claim 1, wherein the predefined range of the backsweep angle ranges from 15 to 60 degrees from a radial direction from the hub.

4. The impeller of claim 1, wherein each of the plurality of blades comprises a coupling side attached to the outer surface of the hub, and wherein the coupling side has a curved profile, such that a plurality of fluidic passages is formed or defined between adjacent blades in the plurality of blades to allow flow of a fluid therethrough.

5. The impeller of claim 1, wherein the outer surface of the hub has a curved profile, wherein an outer diameter of the hub increases in a direction while moving from a leading end towards a trailing end of the hub, and wherein the unattached tip end portion of the hub extends at least partially beyond the outer diameter of the trailing end of the hub.

6. The impeller of claim 1, wherein each of the plurality of blades comprises a coupling side attached to the outer surface of the hub, a leading edge located adjacent to a leading end of the hub, a trailing edge located adjacent to a trailing end of the hub, and a curved edge opposite to the coupling side and extending between the trailing edge and the leading edge.

7. The impeller of claim 1, wherein a trailing edge of the blade of the plurality of blades is circumferentially offset from a corresponding leading edge of the blade.

8. The impeller of claim 1, wherein said at least part of the attached portion is configured at a leading edge of each of the plurality of blades, and wherein said at least part of the attached portion is curved in the direction opposite to the curvature of the unattached tip end portion of the blade.

9. The impeller of claim 6, wherein each of the plurality of blades has a variable thickness between the leading edge and the trailing edge.

10. The impeller of claim 9, wherein the thickness of each of the plurality of blades reduces while moving in a radial direction from the coupling side towards the unattached tip end portion.

11. The impeller of claim 6, wherein each of the plurality of blades has a variable thickness between the coupling side and the curved edge.

12. The impeller of claim 6, wherein a thickness of each of the plurality of blades reduces while moving in a direction from the leading edge towards the trailing edge.

13. The impeller of claim 6, wherein each of the plurality of blades comprises a middle portion, and wherein a thickness of each of the plurality of blades increases while moving from the leading edge towards the middle portion and further reduces while moving towards the trailing edge.

14. The impeller of claim 1, wherein the impeller further comprises a shroud encasing the hub and the plurality of blades, such that a first end of the shroud located adjacent to a leading edge of the plurality of blades remains open to allow inflow of a fluid therewithin, and a second end of the shroud located adjacent to a trailing edge of the plurality of blades remains open to allow outflow of the fluid therefrom.

15. The impeller of claim 14, wherein the shroud encases the hub and the plurality of blades, such that the unattached tip end portion of the plurality of blades remains enclosed by and unattached to the shroud.

16. The impeller of claim 14, wherein the shroud has a curved profile, and wherein a diameter of the shroud increases while moving in a direction from a leading end towards a trailing end of the hub.

17. The impeller of claim 1, wherein the plurality of blades, the hub, and a shroud of the impeller are made of a non-metallic material.

18. The impeller of claim 1, wherein the plurality of blades is made of a composite material having a predetermined flex modulus.

19. The impeller of claim 1, wherein the impeller further comprises a plurality of splitters configured in an alternating arrangement with the plurality of blades such that one of the plurality of splitters remains between adjacent blades of the plurality of blades, and wherein the plurality of splitters extends radially outwards from the hub such that at least a portion of a tip end, opposite to the hub, of a splitter of the plurality of splitters remains unattached to the outer surface of the hub.

20. The impeller of claim 1, wherein the unattached tip end portion of each of the plurality of blades is configured to deflect from a first position, away from a radial direction of the hub, to a second position toward the radial direction of the hub, as the rotational speed of the impeller increases.

* * * * *